June 27, 1933.     A. MONRO ET AL     1,915,899
PRESSURE REGULATING MEANS FOR USE IN INFLATING AND
DEFLATING PNEUMATIC TIRES OR THE LIKE
Filed Dec. 16, 1931     2 Sheets-Sheet 1
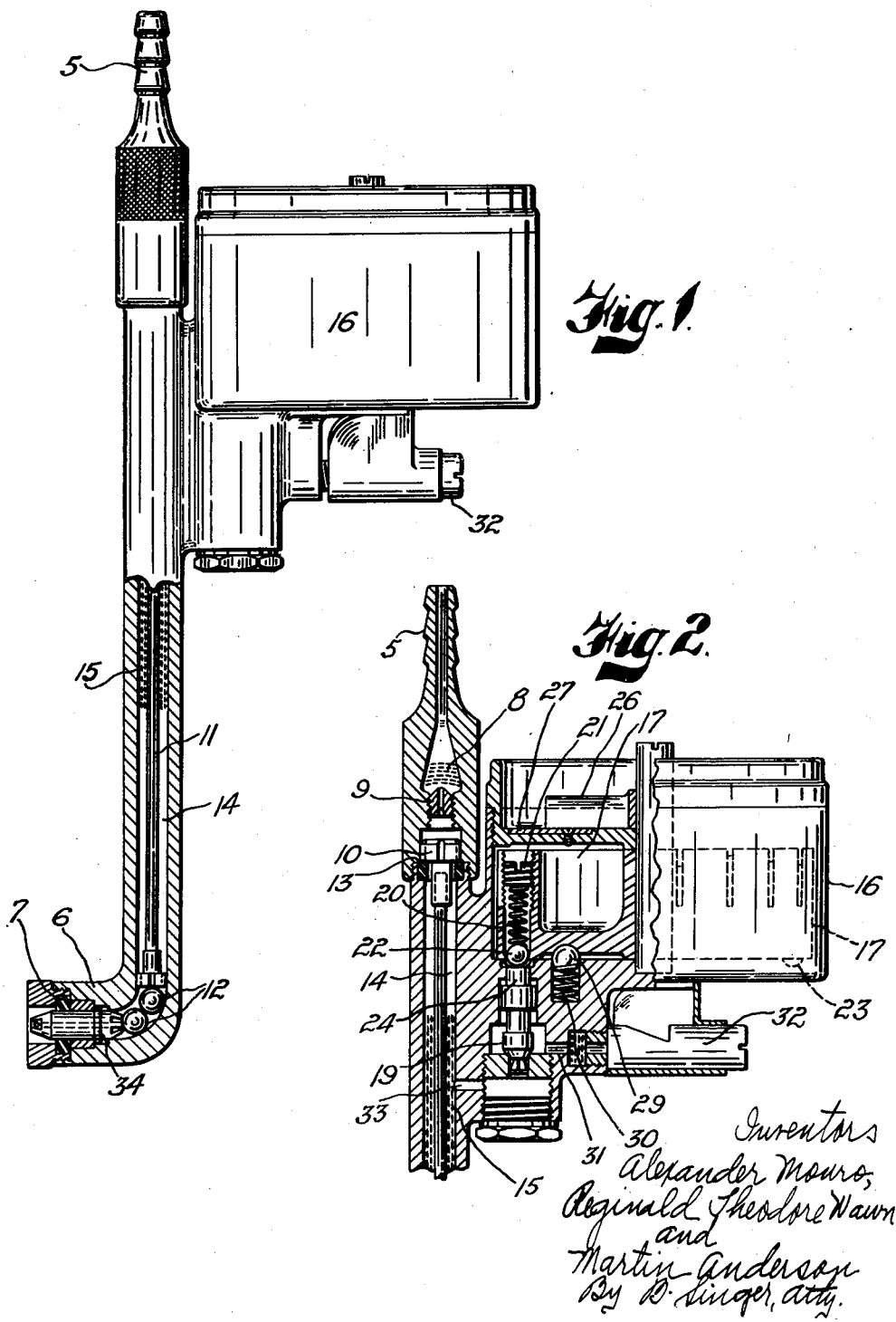

Patented June 27, 1933

1,915,899

UNITED STATES PATENT OFFICE

ALEXANDER MONRO AND REGINALD THEODORE WAWN, OF SYDNEY, NEW SOUTH WALES, AND MARTIN ANDERSON, OF RANDWICK, NEAR SYDNEY, NEW SOUTH WALES, AUSTRALIA

PRESSURE REGULATING MEANS FOR USE IN INFLATING AND DEFLATING PNEUMATIC TIRES OR THE LIKE

Application filed December 16, 1931, Serial No. 581,422, and in Australia August 19, 1931.

This invention relates to means for regulating the supply of air to pneumatic tires and the like, and also is intended when desired to reduce the pressure in the tire or container to a predetermined amount, or to prevent the tire from being inflated above a predetermined pressure.

The present invention more particularly relates to means whereby air may be admitted to a pneumatic tire or the like, henceforth referred to as a tire, until such time as the pressure builds up therein to a predetermined amount, whereupon a valve automatically operates to prevent further air under pressure being admitted to the tire.

An object of the invention is to provide means of the above nature wherein several predetermined pressures are attainable at will, and wherein a warning is given that such selected pressure has been attained.

According to the present invention we combine with a suitable connection socket, a pressure regulating device having means whereby a motor tire, for example, may be inflated to any one of several predetermined pressures.

The various pressures to which the tire may be inflated are determined by bringing into operation one of a plurality of resilient members each of which is adjusted to exert a predetermined force tending to maintain a relief valve in a closed position when brought into engagement therewith and to maintain said valve closed until the pressure in the tire builds up to the desired amount whereupon the relief valve automatically opens against the applied force of the particular resilient abutment and allows the incoming air to pass direct to the atmosphere instead of entering the tire valve, and at the same time, if desired, cause a whistle or other audible signal to be sounded.

The invention also contemplates the provision of means whereby on the connection socket being removed from the valve of the tire the supply of air is prevented from reaching the apparatus.

In order that the invention may be more readily understood reference will now be made to the accompanying drawings wherein:—

Figure 1 is an elevational view of the invention, partly in section, showing the connection socket formed integral with the pressure regulating device and the means adopted for opening the cut-off valve when the connection socket is engaged with the usual tire inflation valve.

Figure 2 is a part sectional elevation of the pressure regulating device showing the drum containing the resilient members one of which is shown engaging the relief valve. The nipple, whereby the supply of air is admitted to the connection socket through a restricted orifice, and the cut-off valve are also shown in this figure.

Figure 3:
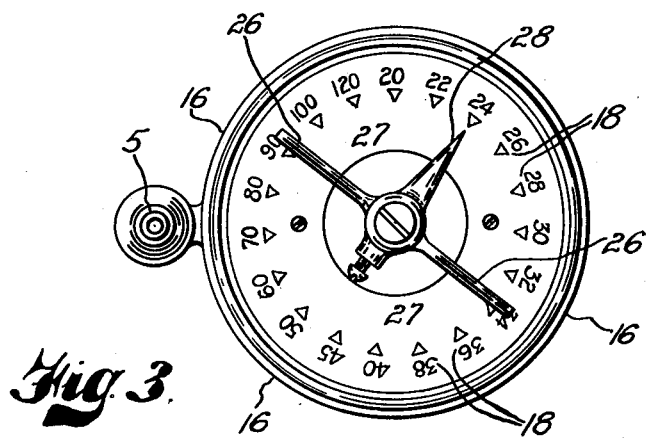
Figure 3 is a plan view showing the dial and pointer used for determining which of the respective resilient members is in engagement with the relief valve.

The usual air pressure hose (not shown) is connected to a nipple 5 forming part of the connection socket portion, of the invention. This latter part has a cup shaped socket 6 having a suitable rubber packing 7 for engaging the usual valve stem of the tire to be inflated.

The nipple 5 is packed with wire gauze 8 and has a restricted orifice 9, see Figure 2, to allow pressure to build up gradually in the tire. Below the orifice 9, a cut-off valve 10 is disposed. This is mounted on a stem 11 extending to the connection socket 6 where it engages a plurality of steel balls 12 which serve to transmit movement to the said stem 11 for the purpose of raising the cut-off valve 10 off its seat 13, when the hollow plunger 34 engages the stem of the tire valve in the act of placing the connection socket thereon for the purpose of inflating a tire in well known manner.

An air space 14 which contains a gauze sleeve 15 communicates with the pressure regulating device by means of a passage 33. It will be apparent that the object of the cut-off valve 10 is to prevent the escape of air from the supply hose when the connection socket is removed from the tire, and for this purpose it is obvious that other forms of valves may be used.

The pressure regulator consists of a casing 16 in which is mounted a drum 17 having a plurality of resilient adjustable members adapted to be selectively brought into engagement with a pressure regulating or relief valve 19 whose function is to relieve the pressure in the air space 14 when the tire has attained the desired pressure.

Figure 4:
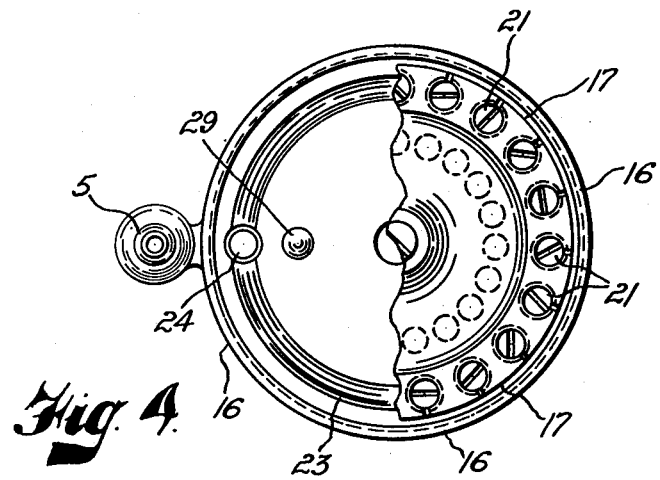
Figure 4 is a similar view to Figure 3 partly in section, and with the dial removed showing the adjusting screws for the respective resilient members, the race for the balls of the respective resilient members and the ball detent provided for temporarily retaining the drum in the desired position.

Referring now more particularly to Figure 2, the casing 16 contains a drum 17 in which are mounted, at suitable intervals, a plurality of springs 20 each of which is disposed between an adjusting screw 21, and a steel ball 22 projecting through an orifice in the lower face of the drum 17. A clearance groove 23 Figure 4, is provided in the bottom of the casing 16 for the balls 22 which are adapted to be brought selectively into engagement with the head 24 of the relief valve 19 when the drum 17 is rotated by means of the handle 26.

A dial 27 is mounted in the casing above the drum 17 and is marked at 18 to indicate the different pressures to which the tire may be required to be inflated. Each marking 18 corresponds with the adjustment or strength of the particular resilient members 20, 21, 22. A pointer 28 capable of being moved over the dial 27, synchronously with the movement of the drum 17, is provided to indicate which of the resilient members is in engagement with the head 24 of the relief valve 19.

A ball 29 which is forced upwards by a spring 30 is provided as a flexible detent to prevent accidental movement of the drum 17.

The function of the relief valve 19 is to open communication to the atmosphere from the air space 14 after the air in the tire has reached the desired pressure. As illustrated in Figure 2, this valve 19 closes a passage 31 leading to the atmosphere, until the valve 19 is lifted against the pressure exerted by the spring 20, by the air pressure in the air space 14.

A whistle 32 or other audible signal is placed in communication with the passage 31 with the result that when air issues therefrom a warning is given. The whistle 32 is adjusted to function only when a gradual flow of air takes place through the passage 31, because it is not desired to sound the warning when a large volume of air is being discharged, for instance when deflating a tire which has been inflated above the desired pressure.

In use the resilient adjustable members 20, 21, 22 for the particular pressure desired is brought into engagement with the head 24 of the relief valve 19 by placing the pointer 28 to register with the number 18 on the dial indicating the pressure required. The connection socket 6 is then placed upon the tire valve and the cut off valve 10 is opened by the plunger 34 and balls 12, admitting air to the tire, in which the pressure builds up to the amount required, whereupon the relief valve 19 opens against the pressure exerted thereon by the resilient members 20, 21, 22.

This allows air to pass to the atmosphere through the passage 31 and causes the whistle 32 to blow, indicating audibly that the desired pressure has been attained. The opening of the valve also prevents further pressure building up in the tire.

On removing the device from the tire valve the escape of air from the hose pipe is prevented by the closing of the cut-off valve 10, due to the pressure of air thereon.

If through any cause the air in the tire exceeds the desired pressure, the apparatus is placed in position as before, then as soon as the air under pressure from the tire enters the air space 14, it causes the valve 19 to lift, and the air being unrestricted in its flow rushes through the passage 31 to the atmosphere, the rust being so great that the whistle will not sound until the pressure falls to the desired amount. At this stage air under pressure is being admitted through the restricted orifice 9 under such conditions, as to cause the whistle 32 to sound, indicating that the air in the tire has been reduced to the desired pressure.

We claim:

1. Pressure regulating means comprising a casing, a relief valve in said casing, a drum in said casing provided with a plurality of resilient members each of which is adjusted to exert a different predetermined force tending to yieldingly maintain the relief valve in the closed position when engaged therewith said drum being rotatable to bring any selected resilient member into engagement with the valve.

2. Pressure regulating means comprising a casing, a relief valve in said casing, a drum rotatable in said casing and provided with a plurality of resilient members each of which comprises a ball, a spring, and means for adjusting the tension of the spring, each of said resilient members tending when brought into engagement with the relief valve to yieldingly maintain the latter in closed position.

In testimony whereof we have hereunto set our hands.

ALEXANDER MONRO.
REGINALD THEODORE WAWN.
MARTIN ANDERSON.